(12) United States Patent
Kalimuthu

(10) Patent No.: US 12,516,741 B2
(45) Date of Patent: Jan. 6, 2026

(54) HYDRAULIC VALVE WITH MANUAL OVERRIDE

(71) Applicant: Worldwide Oilfield Machine, Inc., Houston, TX (US)

(72) Inventor: Anand Kalimuthu, Houston, TX (US)

(*) Notice: Subject to any disclaimer, the term of this patent is extended or adjusted under 35 U.S.C. 154(b) by 237 days.

(21) Appl. No.: 17/962,745

(22) Filed: Oct. 10, 2022

(65) Prior Publication Data

US 2023/0031393 A1    Feb. 2, 2023

Related U.S. Application Data

(60) Provisional application No. 63/255,616, filed on Oct. 14, 2021.

(51) Int. Cl.
| | |
|---|---|
| *F16K 3/02* | (2006.01) |
| *F16K 3/314* | (2006.01) |
| *F16K 29/00* | (2006.01) |
| *F16K 31/143* | (2006.01) |
| *F16K 31/50* | (2006.01) |

(52) U.S. Cl.
CPC ............ *F16K 3/0236* (2013.01); *F16K 3/314* (2013.01); *F16K 29/00* (2013.01); *F16K 31/143* (2013.01); *F16K 31/508* (2013.01); *F16K 3/0254* (2013.01)

(58) Field of Classification Search
CPC ........ F16K 3/0236; F16K 3/314; F16K 29/00; F16K 31/143; F16K 31/508; F16K 3/0254; F16K 31/14
USPC .......................................................... 251/14
See application file for complete search history.

(56) References Cited

U.S. PATENT DOCUMENTS

| | | | |
|---|---|---|---|
| 2,630,829 A * | 3/1953 | Shafer | F16K 31/143 74/89.25 |
| 2,977,977 A | 4/1961 | Pennington | |
| 2,991,042 A * | 7/1961 | Natho | F16K 3/0254 251/291 |
| 3,378,224 A | 4/1968 | Boyle | |
| 3,379,405 A | 4/1968 | Natho | |
| 3,466,001 A | 9/1969 | Nelson | |
| 3,572,032 A | 3/1971 | Terry | |
| 3,628,397 A * | 12/1971 | Sheesley | F16H 25/2204 74/625 |
| 3,765,642 A | 10/1973 | Nelson | |
| 3,842,854 A | 10/1974 | Wicke | |
| 3,889,922 A | 6/1975 | Peters | |
| 3,913,883 A | 10/1975 | Irwin | |
| 4,081,027 A | 3/1978 | Nguyen et al. | |
| 4,212,355 A | 7/1980 | Reardon | |
| 4,213,480 A | 7/1980 | Orum et al. | |

(Continued)

FOREIGN PATENT DOCUMENTS

| | | |
|---|---|---|
| EP | 0280805 | 8/1988 |
| GB | 1464452 | 2/1977 |

(Continued)

*Primary Examiner* — John Bastianelli
(74) *Attorney, Agent, or Firm* — Kenneth L. Nash; Thomas D. Nash

(57) ABSTRACT

A manual operator usable with a hydraulic operator is connected to move a gate within a gate valve body between a valve open and a valve closed position. The manual operator is used to operate the gate valve when the hydraulic operator is not used. On the other hand, a handwheel for the manual operator can be removed when the hydraulic actuator is used to operate the gate valve.

5 Claims, 2 Drawing Sheets

(56) References Cited

U.S. PATENT DOCUMENTS

| | | | |
|---|---|---|---|
| 4,215,749 A | 8/1980 | Dare et al. |
| 4,230,299 A | 10/1980 | Pierce, Jr. |
| 4,240,455 A | 12/1980 | McGee |
| 4,414,995 A | 11/1983 | Spencer |
| 4,423,748 A | 1/1984 | Ellett |
| 4,436,279 A | 3/1984 | Bonds et al. |
| 4,437,521 A | 3/1984 | Richardson et al. |
| 4,445,424 A | 5/1984 | Foster et al. |
| 4,569,503 A * | 2/1986 | Karr, Jr. | F16K 31/1221 |
| | | | 251/327 |
| 4,590,823 A | 5/1986 | Neves et al. |
| 4,619,434 A | 10/1986 | Snyder et al. |
| 4,649,704 A | 3/1987 | Marsh |
| 4,650,151 A | 3/1987 | McIntyre |
| 4,668,126 A | 5/1987 | Burton |
| 4,671,312 A | 6/1987 | Bruton |
| 4,691,893 A * | 9/1987 | Akkerman | F16K 31/143 |
| | | | 137/553 |
| 4,744,386 A | 5/1988 | Frazer |
| 4,753,292 A | 6/1988 | Ringgenberg et al. |
| 4,790,378 A | 12/1988 | Montgomery et al. |
| 4,809,733 A | 3/1989 | Hawkins |
| 4,827,963 A | 5/1989 | Baker et al. |
| 4,830,107 A | 5/1989 | Rumbaugh |
| 4,836,243 A | 6/1989 | Ferrell |
| 4,878,651 A | 11/1989 | Meyer, Jr. |
| 4,886,115 A | 12/1989 | Leggett et al. |
| 4,921,207 A | 5/1990 | Baker |
| 4,967,785 A | 11/1990 | Young |
| 4,997,162 A | 3/1991 | Baker et al. |
| 5,046,376 A * | 9/1991 | Baker | F16K 31/1221 |
| | | | 74/424.78 |
| 5,269,340 A | 12/1993 | Drzewiecki |
| 5,501,424 A | 3/1996 | Williams et al. |
| 5,803,431 A | 9/1998 | Hoang et al. |
| 5,845,708 A | 12/1998 | Burge et al. |
| 5,894,771 A | 4/1999 | Braun et al. |
| 5,938,175 A | 8/1999 | Young et al. |
| 6,041,804 A | 3/2000 | Chatufale |
| 6,109,353 A | 8/2000 | Edwards |
| 6,209,650 B1 | 4/2001 | Ingebrigtsen et al. |
| 6,223,825 B1 | 5/2001 | Ingebrigtsen et al. |
| 6,260,822 B1 | 7/2001 | Puranik |
| 6,457,370 B1 | 10/2002 | Okano |
| 6,575,426 B2 * | 6/2003 | Sundararajan | E21B 33/063 |
| | | | 251/63.5 |
| 6,601,650 B2 | 8/2003 | Sundararajan |
| 6,684,897 B2 | 2/2004 | Sundararajan |
| 6,966,537 B2 | 11/2005 | Sundararajan |
| 7,013,970 B2 | 3/2006 | Collie et al. |
| 7,040,408 B2 | 5/2006 | Sundararajan |
| 7,578,349 B2 | 8/2009 | Sundararajan |
| 7,849,926 B2 | 12/2010 | Inderberg |
| 8,091,861 B2 | 1/2012 | Nesje |
| 9,732,576 B2 | 8/2017 | Rao |
| 10,006,266 B2 | 6/2018 | Sundararajan |
| 2019/0032793 A1 | 1/2019 | Lah |

FOREIGN PATENT DOCUMENTS

| | | |
|---|---|---|
| JP | 2014142001 | 8/2014 |
| RU | 2594450 | 8/2016 |

\* cited by examiner

HYDRAULIC VALVE WITH MANUAL OVERRIDE

FIELD OF THE INVENTION

The present invention relates to oil and gas gate valves and more specifically a hydraulic gate valve with manual override.

DESCRIPTION OF THE PRIOR ART

Gate valves are well known. Generally, they are normally hydraulically or manually operated. However, when the hydraulic operator fails or is not available in some cases it is difficult to operate the valve manually.

SUMMARY OF THE INVENTION

One general aspect includes a gate valve with a valve body defining a flow path therethrough. The valve also includes a gate moveable in the valve body between a valve open position which allows flow through the flow path and a valve closed position which blocks flow through the flow path; a manual operator stem; a ball screw operatively connected to the manual operator stem; a hydraulic actuator may include a piston and a piston cylinder; a first piston shaft, an interconnection of the first piston shaft, the manual operator stem and the ball screw being configured so that translational movement of the piston of the hydraulic actuator is transformed into rotational movement of the manual operator stem and rotational movement of the manual operator stem is transformed into translational movement of the piston; and a second piston shaft on an opposite side of the piston from the first piston shaft, the second piston shaft being operatively connected to the gate.

Implementations may include one or more of the following features. The gate valve may include a handwheel, the handwheel being mountable to the manual operator stem to open and close the gate valve when the hydraulic actuator is not in use. The gate valve wherein the handwheel is removable from the manual operator stem when the hydraulic actuator is used for opening and closing the gate valve. The gate valve may include a second manual override on an opposite side of the valve body from the hydraulic actuator, the second manual override being moveable against the gate.

DETAILED DESCRIPTION OF THE PRESENT INVENTION

Figure 1:
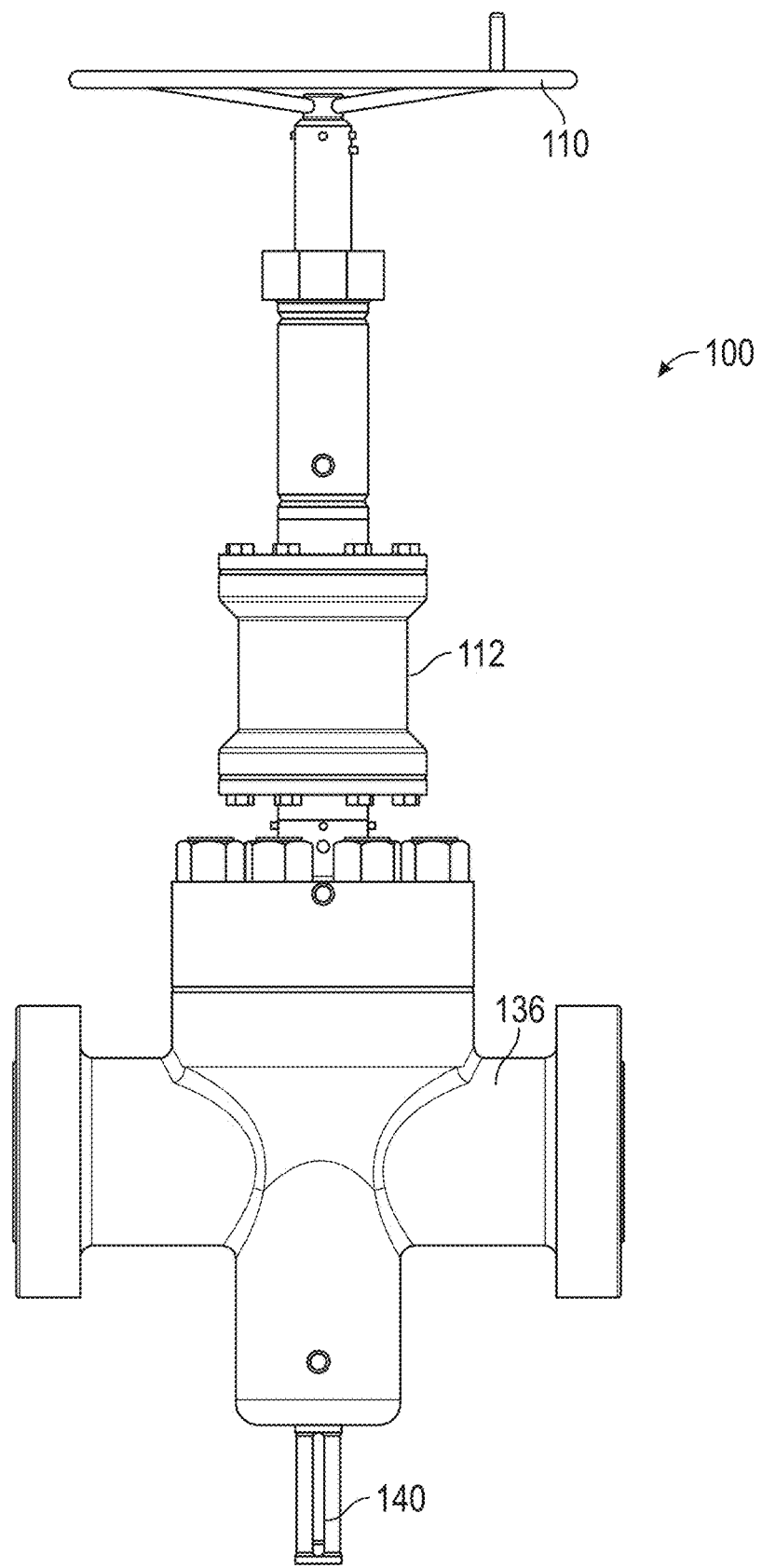
FIG. 1 is an elevation external view of a gate valve that includes a hydraulic actuator and a manual operator in accord with one possible embodiment of the present invention.
Figure 2:
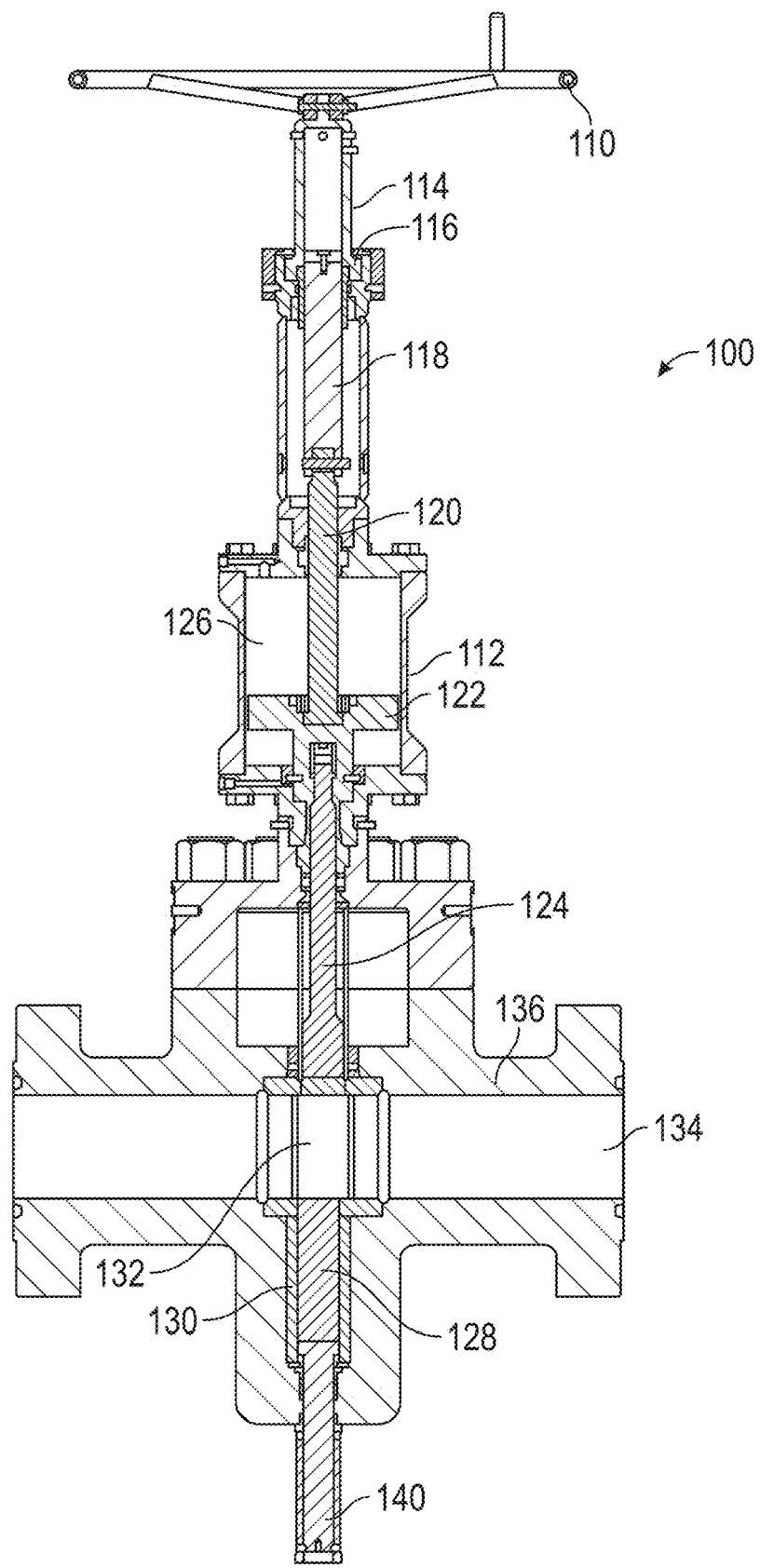
FIG. 2 is an elevation cutaway view of the gate valve of claim 1 showing the internal construction of the gate valve in accord with one possible embodiment of the present inventions.

FIG. 1 and FIG. 2 disclose gate valve 100. Gate valve 100 will operate at 15,000 psi differential pressure using manual override operator 110, which in this embodiment is shown as handwheel 110, While handwheel 110 is show in a particular embodiment, it will be understood that handwheel 110 may be of many different constructions. For example, instead of a wheel, manual override operator may be a handle or any other construction that will rotate manual override stem 114.

In case of hydraulic failure or unavailability of hydraulic actuator 2, gate valve 100 can be operated with the manual override wheel 110.

In more detail, manual override wheel 110 rotates manual override stem 114 which turns ball screw 116. Ball screws are well known to people skilled in the art and generally turn with very low friction. Ball screw 116 reduces the torque required to operate the valve 100 manually. Accordingly, one embodiment may utilize a ball screw to minimize friction, if desired.

Manual override stem 114 is connected to shaft 118 through ball screw 116 in a rotational movement to translational movement configuration. As shaft 118 moves up and down, override stem 114 rotates clockwise and counterclockwise. It will be appreciated that numerous different mechanical arrangements are possible to convert translational to rotational movement are available. Accordingly; the components are referred to as being operationally connected in this manner and may use various piston shaft, manual override stem and screw connections.

Accordingly, rotation of manual override stem 114 with manual override wheel 110 will move shaft 118 up and down depending on the direction of rotation. Shaft 118 connects to first piston shaft 120. First piston shaft 120 may be moved by either hydraulic piston 122 or by manual override wheel 110. Hydraulic piston 122 is mounted within piston chamber 126.

Second piston shaft 124 connects to the other side of hydraulic piston 122 from first piston shaft 120. Second piston shaft 124 connects to gate 128 and moves gate 128 between an open and closed position. Gate 128 includes a flat portion 130 and an opening 132 that control fluid flow through passageway 134.

Gate 128 is mounted in valve body 136, to which the hydraulic actuator 112 and manual operator 110 are attached.

When hydraulic actuator 112 is used to open and/or close gate valve 100, the manual override stem 114 will rotate. For this reason, handwheel 110 is preferably removed when the hydraulic actuator 112 is used to open and close the valve. However, when the manual override 110, 114, 116, 118 must be used, the handwheel 110 is installed to operate the valve. If hydraulic power is restored, then the handwheel 110 is removed so that hydraulic actuator 112 is used again.

A second manual override 140 is mounted to a bottom of the valve body. The second manual override 140 can be screwed into the chamber to engage the gate when the gate is closed instead of open as shown. In this way, the valve can be locked in the closed position if desired.

The invention claimed is:

1. A gate valve, comprising:
    a valve body defining a flow path therethrough;
    a gate moveable in said valve body between a valve open position which allows flow through said flow path and a valve closed position which blocks flow through said flow path;
    a manual operator stem, said manual operator stem comprising a first shaft portion and a second shaft portion, said first shaft portion comprising a cross-section with a metallic boundary, said metallic boundary enclosing an unobstructed internal space extending longitudinally therein, said first shaft portion being connected to said second shaft portion, said second shaft portion comprising a solid metallic cross-section, said solid metallic cross-section comprises an outer periphery with flat sides that longitudinally extend along a substantial portion of said outer periphery of said second shaft portion;

a ball screw operatively connected to said manual operator stem, said first shaft portion terminating with said ball screw at one end and being connectable to a manual operator at an opposite end of said first shaft portion;

a hydraulic actuator comprising a piston and a piston cylinder, said ball screw being positioned outside of said piston cylinder;

a first piston shaft, an interconnection of said first piston shaft, said manual operator stem and said ball screw being configured so that translational movement of said piston of said hydraulic actuator is transformed into rotational movement of said manual operator stem and rotational movement of said manual operator stem is transformed into translational movement of said piston; and a second piston shaft on an opposite side of said piston from said first piston shaft, said second piston shaft being operatively connected to said gate.

2. The gate valve of claim 1, further comprising a handwheel, said handwheel being mountable to said manual operator stem to open and close said gate valve when said hydraulic actuator is not in use, said handwheel being axially spaced apart from said ball screw along an axis of said manual operator stem.

3. The gate valve of claim 2, where said handwheel is removable from said manual operator stem when said hydraulic actuator is used for opening and closing said gate valve, wherein said ball screw does not comprise balls that extend through said first shaft portion, and wherein said ball screw and said first shaft portion are mounted to remain in position when said hydraulic actuator is used for opening and closing said gate.

4. The gate valve of claim 1, further comprising a manual override shaft on an opposite side of said valve body from said hydraulic actuator, said manual override shaft being screwably moveable against said gate, said manual override shaft comprising a solid metallic cross-section along at least a substantial portion of a length of said manual override shaft, said manual override shaft being mounted to be screwably moveable into said valve body toward said flow path in order to move from a non-engaged position with said gate to engage and lock said gate into a closed position.

5. The gate valve of claim 1, further comprising said gate valve being selectively movable to said valve open position or said valve closed position without a spring bias.

\* \* \* \* \*